(12) United States Patent
Wong et al.

(10) Patent No.: US 12,407,249 B2
(45) Date of Patent: Sep. 2, 2025

(54) SUPPLY CIRCUIT AND SWITCHED MODE POWER SUPPLY

(71) Applicant: Joulwatt Technology Co., Ltd., Hangzhou (CN)

(72) Inventors: Pitleong Wong, Hangzhou (CN); Weijun Mao, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 265 days.

(21) Appl. No.: 18/235,362

(22) Filed: Aug. 18, 2023

(65) Prior Publication Data

US 2024/0072655 A1    Feb. 29, 2024

(30) Foreign Application Priority Data

Aug. 24, 2022 (CN) .......................... 202211015601.0
Apr. 10, 2023 (CN) .......................... 202310396707.8

(51) Int. Cl.
*H02M 3/07* (2006.01)
*H02M 1/36* (2007.01)
*H02M 3/158* (2006.01)

(52) U.S. Cl.
CPC ............... *H02M 3/07* (2013.01); *H02M 1/36* (2013.01); *H02M 3/158* (2013.01)

(58) Field of Classification Search
CPC ........... H02M 3/07; H02M 1/36; H02M 3/158
See application file for complete search history.

(56) References Cited

U.S. PATENT DOCUMENTS

| 7,190,208 | B2* | 3/2007 | Ribarich | ............. H02M 7/5387 327/423 |
| 2016/0294286 | A1* | 10/2016 | Cui | ................... H02M 3/33507 |
| 2017/0108889 | A1* | 4/2017 | Sahar | ........................ G05F 3/02 |
| 2022/0393623 | A1* | 12/2022 | Sugie | ..................... H02K 11/20 |

* cited by examiner

*Primary Examiner* — Rafael O De Leon Domenech
(74) *Attorney, Agent, or Firm* — Bayramoglu Law Offices LLC

(57) ABSTRACT

A supply circuit and a switched mode power supply (SMPS) are provided. The supply circuit includes a first capacitor, a second capacitor, and a charging-discharging control circuit; the first capacitor includes a first terminal connected to a switching node, and a second terminal for providing a first supply voltage; the second capacitor includes a first terminal connected to a reference ground or a first potential terminal under control of the charging-discharging control circuit, and a second terminal for providing a second supply voltage; and according to a charging-discharging enable signal, the charging-discharging control circuit charges the second capacitor in a first time period and discharges the second capacitor in a second time period.

20 Claims, 7 Drawing Sheets

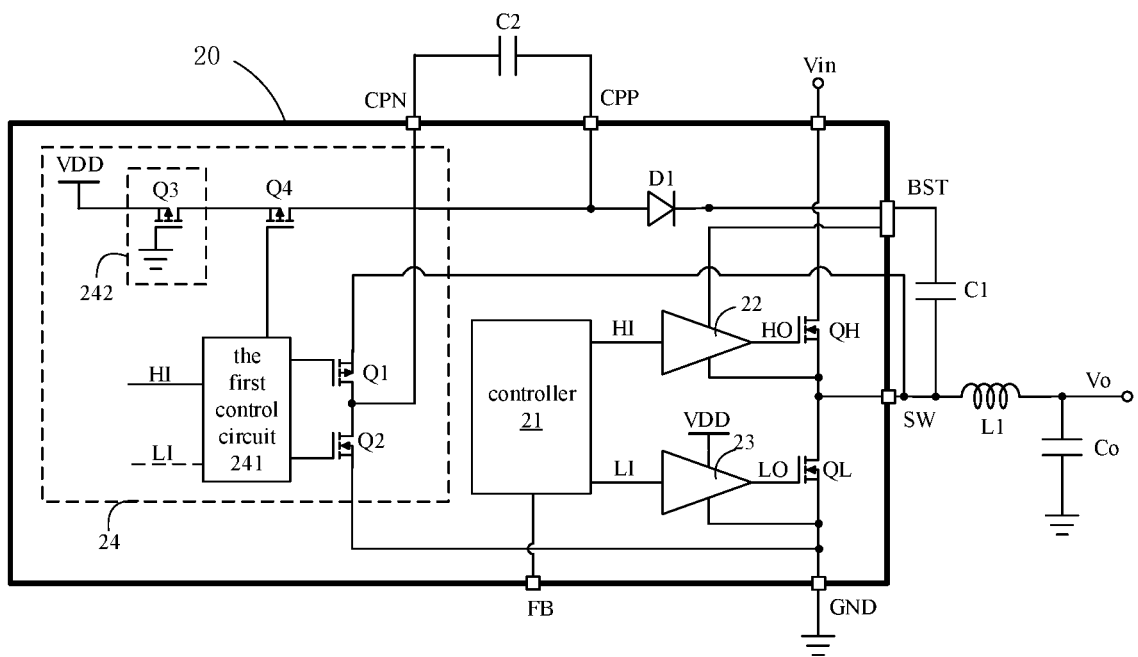
FIG. 7 (electrical block diagram of added embodiment)

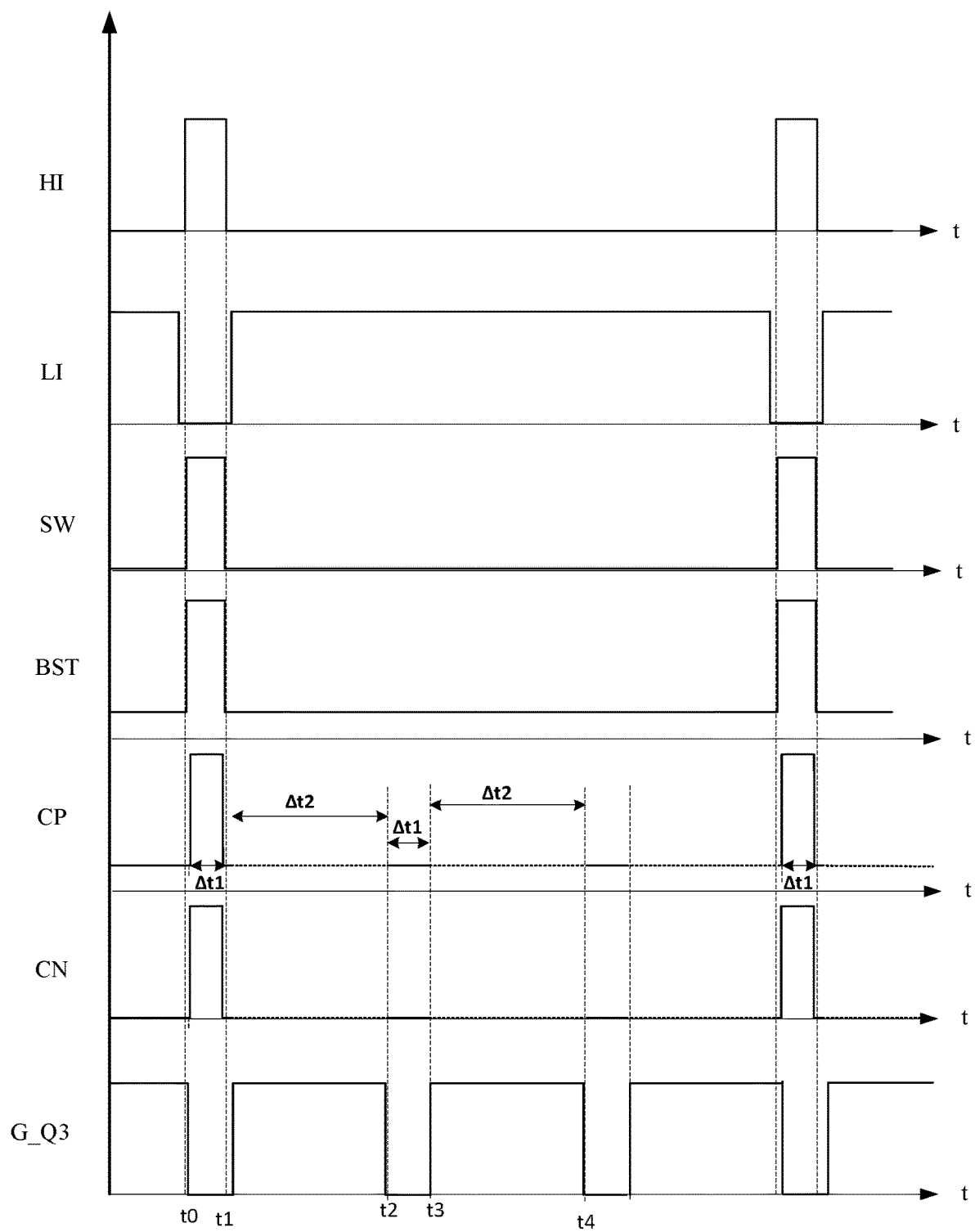
FIG. 8 (HI is a narrow pulse and LI is a high pulse)

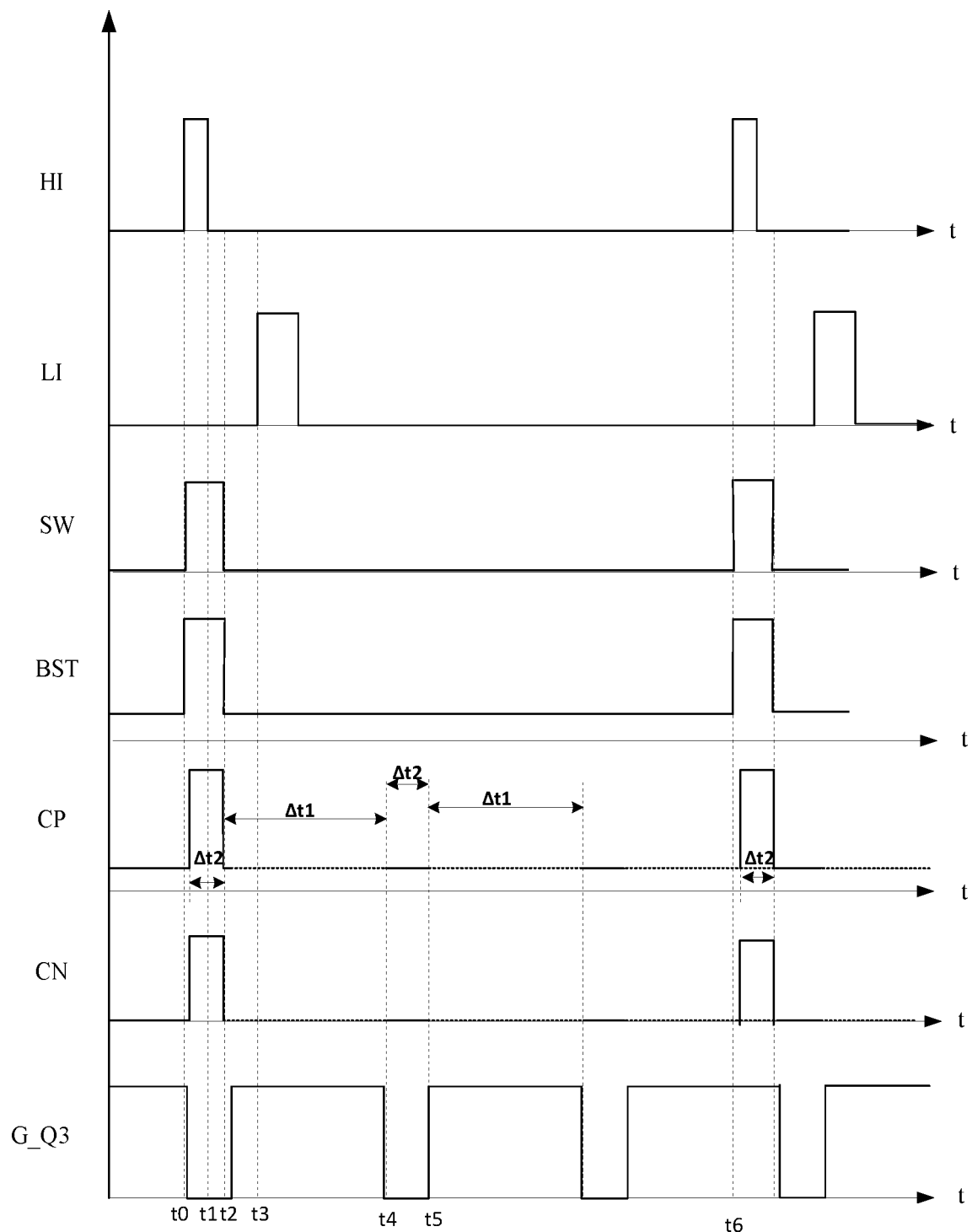
FIG. 9 (both HI and LI are narrow pulses)

SUPPLY CIRCUIT AND SWITCHED MODE POWER SUPPLY

CROSS REFERENCE TO THE RELATED APPLICATIONS

This application is based upon and claims priority to Chinese Patent Application No. 202211015601.0, filed on Aug. 24, 2022; and Chinese Patent Application No. 202310396707.8, filed on Apr. 10, 2023, the entire contents of which are incorporated herein by reference.

TECHNICAL FIELD

The present disclosure relates to the technical field of power conversion, and in particular to a supply circuit and a switched mode power supply (SMPS).

BACKGROUND

For existing half-bridge switching circuits, voltage is converted mainly by controlling the on-off state of two interconnected transistors. With a step-down conversion circuit such as a BUCK circuit for example, as shown in FIG. 1, a control unit 11 sends a pulse signal to gates of two connected switching transistors (QH and QL). By means of a duty cycle of the switching transistors, an induced voltage of a power inductor L in the step-down conversion circuit is controlled, thereby realizing voltage conversion.

For the sake of better electrical performance in the step-down process, an N-channel metal oxide semiconductor (NMOS) transistor is usually used as a high-side switch. When the high-side NMOS transistor needs to be turned on, a power terminal of the high-side switch is connected to an input voltage. Hence, a potential higher than the input voltage Vin is provided essentially to serve as a driving voltage of the high-side switching transistor QH.

As shown in FIG. 1, a bootstrap capacitor C1 is usually used as a power supply to provide a sufficient driving voltage for the high-side switch QH. The bootstrap capacitor C1 is charged by a power supply VCC when the low-side switch QL is turned on. However, due to long turn-on time of the high-side switch in some cases, the low-side switch has short turn-on time or is not turned on, and the corresponding bootstrap capacitor (C1) is not charged sufficiently. As a result, the high-side switch has an insufficient driving voltage and cannot work normally. Therefore, there is a need to provide an improved technical solution to overcome the above technical problem in the prior art.

SUMMARY

In view of this, an objective of the present disclosure is to provide a supply circuit and an SMPS, to solve the technical problem of insufficient supply of a high-side switching transistor in the prior art.

The present disclosure provides the following technical solutions: The present disclosure provides a supply circuit for an SMPS. The SMPS includes a high-side switching transistor and a low-side switching transistor that are connected through a switching node; the high-side switching transistor is driven by a high-side driver; the high-side switching transistor and the low-side switching transistor are switched to convert an input voltage into an output voltage; and the supply circuit includes: a first capacitor, a second capacitor, and a charging-discharging control circuit, where the first capacitor includes a first terminal connected to the switching node, and a second terminal for providing a first supply voltage; the second capacitor includes a first terminal connected to a reference ground or a first potential terminal under control of the charging-discharging control circuit, and a second terminal for providing a second supply voltage; both the first supply voltage and the second supply voltage are used as supply sources for the high-side driver; and the charging-discharging control circuit charges and discharges the second capacitor according to a charging-discharging enable signal, and specifically charges the second capacitor in a first time period and discharges the second capacitor in a second time period, thereby maintaining stable supply for the high-side driver.

Preferably, the second terminal of the first capacitor is connected to a supply terminal of the high-side driver to provide the first supply voltage for the high-side driver; the second terminal of the second capacitor is connected to the supply terminal of the high-side driver to provide a supply voltage for the high-side driver; and the second terminal of the second capacitor is connected to the second terminal of the first capacitor to provide a supply voltage for the first capacitor.

Preferably, the second terminal of the second capacitor is connected to the second terminal of the first capacitor to provide a supply voltage for the first capacitor; and the second terminal of the first capacitor is connected to a supply terminal of the high-side driver to provide the first supply voltage for the high-side driver.

Preferably, the first potential terminal serves as an input voltage connecting terminal.

Preferably, the charging-discharging control circuit receives a switching signal of the high-side switching transistor and/or a voltage of the switching node, and obtains the charging-discharging enable signal to charge and discharge the second capacitor.

Preferably, when the voltage of the switching node jumps from a low level to a high level or the switching signal of the high-side switching transistor changes from invalid to valid, the charging-discharging control circuit charges the second capacitor.

Preferably, the charging-discharging control circuit discharges the second capacitor after charging the second capacitor for the first time period; and before the voltage of the switching node jumps from the high level to the low level or when the switching signal of the high-side switching transistor changes from valid to invalid, the charging-discharging control circuit stops discharging the second capacitor, discharging time of the second capacitor being labeled as the second time period.

Preferably, when the voltage of the switching node jumps from a low level to a high level or the switching signal of the high-side switching transistor changes from invalid to valid, the charging-discharging control circuit charges the second capacitor for a first time, and the charging-discharging control circuit discharges the second capacitor for a first time after charging the second capacitor for the first time period; and after the charging-discharging control circuit discharges the second capacitor for the second time period, if the voltage of the switching node does not jump from the low level to the high level or the switching signal of the high-side switching transistor does not change from invalid to valid, the charging-discharging control circuit charges the second capacitor for a second time, and the charging-discharging control circuit discharges the second capacitor for a second time after charging the second capacitor for the first time period, and so on.

Preferably, in the first time period, under the control of the charging-discharging control circuit, the second terminal of the second capacitor receives a reference power voltage to charge the second capacitor, and the first terminal of the second capacitor is connected to the reference ground; and in the second time period, the second terminal of the second capacitor outputs supply charges through a first unidirectional conducting device, and the first terminal of the second capacitor is connected to the input voltage connecting terminal.

Preferably, in the first time period, the charging-discharging control circuit charges the second capacitor with the reference power voltage; when the high-side switching transistor is turned off, the charging-discharging control circuit recharges the second capacitor with the reference power voltage; and the second supply voltage is used to charge the first capacitor.

Preferably, the first potential terminal serves as a common node for the high-side switching transistor and the low-side switching transistor.

Preferably, the charging-discharging control circuit receives a switching signal of the high-side switching transistor or a switching signal of the low-side switching transistor, and obtains the charging-discharging enable signal to charge and discharge the second capacitor.

Preferably, when the switching signal of the high-side switching transistor or the switching signal of the low-side switching transistor indicates that the high-side switching transistor is turned on, the charging-discharging control circuit discharges the second capacitor.

Preferably, the charging-discharging control circuit charges the second capacitor after discharging the second capacitor for the second time period; after the second capacitor is charged for the first time period, the charging-discharging control circuit stops charging the second capacitor; and the charging-discharging control circuit times a duration of the first time period and a duration of the second time period through a timer circuit.

Preferably, the charging-discharging control circuit discharges the second capacitor for a first time; the charging-discharging control circuit charges the second capacitor for a first time after discharging the second capacitor for the second time period; after the charging-discharging control circuit discharges the second capacitor for the second time period, if the switching signal of the high-side switching transistor or the switching signal of the low-side switching transistor does not indicate that the high-side switching transistor is turned on, the charging-discharging control circuit discharges the second capacitor for a second time, and the charging-discharging control circuit charges the second capacitor for a second time after discharging the second capacitor for the second time period, and so on.

Preferably, when the switching signal of the high-side switching transistor or the switching signal of the low-side switching transistor indicates that the high-side switching transistor is turned on, the charging-discharging control circuit clears a present working state of the second capacitor, and discharges the second capacitor with the duration of the second time period as a timing start point.

Preferably, in the second time period, under the control of the charging-discharging control circuit, the second terminal of the second capacitor receives a reference power voltage to charge the second capacitor, and the first terminal of the second capacitor is connected to the reference ground; and in the first time period, the second terminal of the second capacitor outputs supply charges through a first unidirectional conducting device, and the first terminal of the second capacitor is connected to the common node.

Preferably, the charging-discharging control circuit includes a first switching transistor and a second switching transistor connected between the first potential terminal and the reference ground, a voltage stabilizing circuit, and a first control circuit; the first control circuit receives the charging-discharging enable signal to turn on/off the first switching transistor and the second switching transistor; and the voltage stabilizing circuit is connected between a reference power voltage and the second terminal of the second capacitor.

Preferably, the voltage stabilizing circuit includes a third switching transistor and a second unidirectional conducting device; the third switching transistor includes a control terminal connected to the reference ground, a first power terminal connected to the reference power voltage, and a second power terminal connected to a positive electrode of the second unidirectional conducting device; and a negative electrode of the second unidirectional conducting device is connected to the second terminal of the second capacitor.

Preferably, the voltage stabilizing circuit includes a third switching transistor and a fourth switching transistor; the third switching transistor includes a control terminal connected to the reference ground, a first power terminal connected to the reference power voltage, and a second power terminal connected to a first power terminal of the fourth switching transistor; a second power terminal of the fourth switching transistor is connected to the second terminal of the second capacitor; and the first control circuit turns on or off the fourth switching transistor according to the charging-discharging enable signal.

According to a second aspect, the present disclosure provides an SMPS, including a controller, a high-side switching transistor and a low-side switching transistor connected through a switching node, a high-side driver for driving the high-side switching transistor, and a low-side driver for driving the low-side switching transistor, and further including the supply circuit, where the high-side driver and the low-side driver receive a switching signal from the controller to turn on or off the high-side switching transistor and the low-side switching transistor; and the supply circuit supplies power to the high-side driver.

The circuit structure of the present disclosure realizes dual supply through the first capacitor and the second capacitor. In case of insufficient charging time of the first capacitor and insufficient supply charges of the first capacitor, the second capacitor can be discharged timely to supplement the charges. This ensures that the driver of the high-side switching transistor can be supplied with enough charges, and the high-side switching transistor can work normally.

BRIEF DESCRIPTION OF THE DRAWINGS

FIG. 7 is a block diagram of a supply circuit for an SMPS according to Embodiment 4 of the present disclosure;

FIG. 8 illustrates a waveform chart of a first condition in FIG. 7; and

FIG. 9 illustrates a waveform chart of a second condition in FIG. 7.

DETAILED DESCRIPTION OF THE EMBODIMENTS

The preferred embodiments of the present disclosure are described in detail below with reference to the drawings, but the present disclosure is not limited to these embodiments. The present disclosure covers any substitution, modification, equivalent method and solution made within the spirit and scope of the present disclosure.

For a better understanding of the present disclosure, the specific details of the following preferred embodiments of the present disclosure are explained hereinafter in detail, while the present disclosure can also be fully understood by those skilled in the art without the description of these details.

The present disclosure is described in detail by giving examples with reference to the drawings. It should be noted that the drawings are simplified and do not use an accurate proportion, that is, the drawings are merely for the objectives of conveniently and clearly assisting in illustrating embodiments of the present disclosure.

Figure 1:
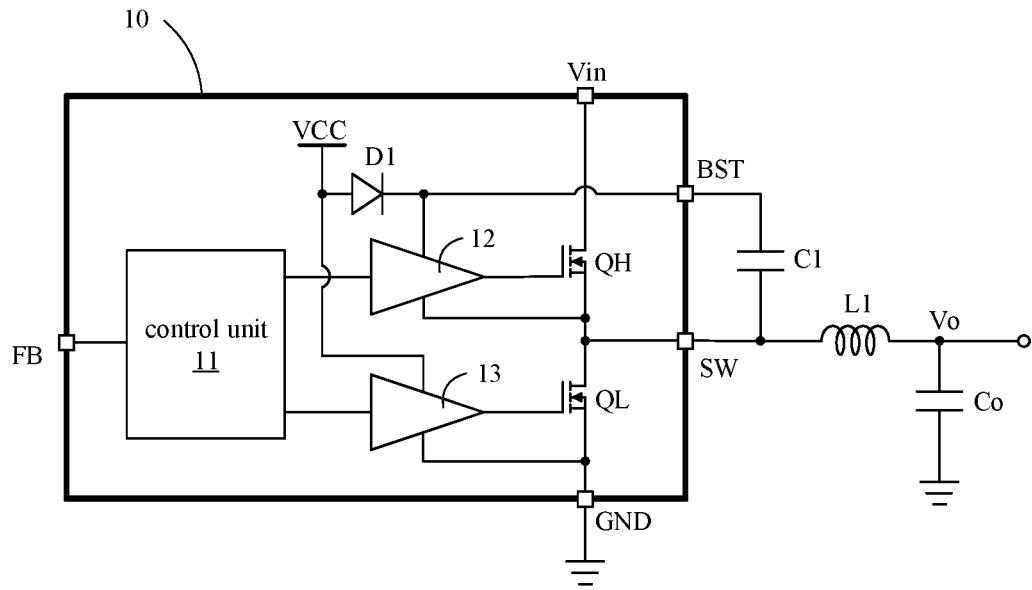
FIG. 1 is a schematic supply diagram of a step-down conversion circuit in the prior art.
Figure 2:
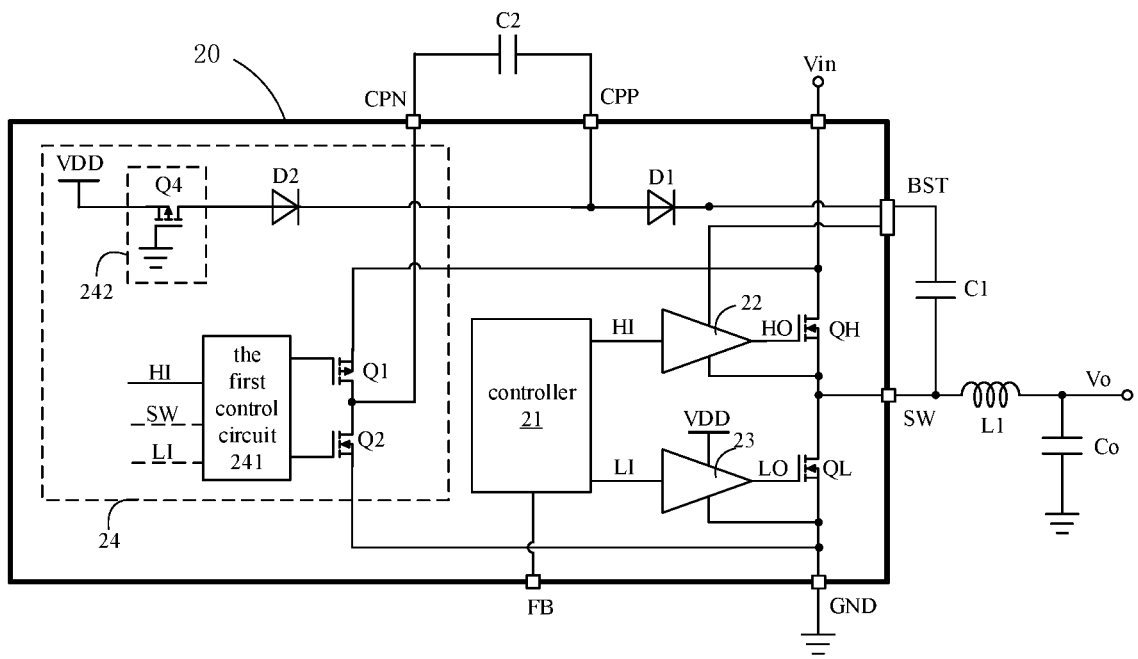
FIG. 2 is a block diagram of a supply circuit for an SMPS according to Embodiment 1 of the present disclosure.

FIG. 2 is a block diagram of a supply circuit for an SMPS according to Embodiment 1 of the present disclosure. The SMPS includes high-side switching transistor QH and low-side switching transistor QL that are connected through switching node SW. The high-side switching transistor QH is driven by high-side driver 22. The low-side switching transistor QL is driven by low-side driver 23. Controller 21 generates a switching signal for the drivers. Inductor L1 is connected between the switching node and an output voltage, thereby forming a step-down SMPS. The high-side switching transistor QH and the low-side switching transistor QL are switched to convert input voltage Vin into the output voltage Vo. Exemplarily, the supply circuit includes first capacitor C1, second capacitor C2, and charging-discharging control circuit 24. The first capacitor C1 includes a first terminal connected to the switching node SW, and a second terminal for providing a first supply voltage. The second capacitor includes first terminal CPN connected to reference ground GND or a first potential terminal such as an input voltage Vin connecting terminal under control of the charging-discharging control circuit, and second terminal CPP for providing a second supply voltage. In a switching cycle, according to a charging-discharging enable signal, the charging-discharging control circuit charges the second capacitor in a first time period and discharges the second capacitor in a second time period, thereby maintaining stable supply for the high-side driver. Herein, both the first supply voltage and the second supply voltage are used as supply sources for the high-side driver. The supply sources may be direct sources, and may also be indirect sources. In the embodiment, when the high-side switching transistor is turned on, the charging-discharging control circuit charges the second capacitor in the first time period, and discharges the second capacitor in the second time period, thereby maintaining the stable supply for the high-side driver.

Specifically, in the first time period, under the control of the charging-discharging control circuit, the second terminal of the second capacitor C2 receives reference power voltage VDD to charge the second capacitor, and the first terminal of the second capacitor is connected to the reference ground. In the second time period, the second terminal of the second capacitor is discharged through a first unidirectional conducting device to provide supply charges, and the first terminal of the second capacitor C2 is connected to the input voltage. Herein, the first unidirectional conducting device is diode D1.

For the example shown in FIG. 2, the second terminal BST of the first capacitor is connected to a supply terminal of the high-side driver to provide the first supply voltage for the high-side driver. The second terminal of the second capacitor is connected to the supply terminal of the high-side driver to provide a supply voltage for the high-side driver. The second terminal of the second capacitor is connected to the second terminal of the first capacitor to charge the first capacitor. In other words, in the second time period, the second supply voltage of the second capacitor C2 is output through the diode D1 in two transmission branches, one of which supplements supply charges to the high-side driver, and the other charges the first capacitor to supplement charges of the first capacitor. When the high-side switching transistor QH is turned on for long time, and the first capacitor C1 has insufficient charging time and insufficient charges, the above method supplements the charges through the second capacitor C2, and can make the SMPS work normally in any duty cycle.

Referring also to FIG. 2, the second capacitor is charged and discharged under the control of the charging-discharging control circuit 24. The charging-discharging control circuit receives a switching signal of the high-side switching transistor (which may also be a switching signal of the low-side switching transistor) or a voltage of the switching node, and obtains a charging-discharging enable signal according to the switching signal or the voltage of the switching node to charge and discharge the second capacitor. For example, the charging-discharging enable signal may be a pulse trigger signal generated according to a rising edge of the switching signal. Specifically, the charging-discharging control circuit includes first switching transistor Q1 and second switching transistor Q2 connected between the input voltage and the reference ground, a voltage stabilizing circuit, and first control circuit 241. Third switching transistor Q3 includes a control terminal connected to the reference ground, a first power terminal connected to the reference power voltage VDD, and a second power terminal connected to a positive electrode of a second unidirectional conducting device. A negative electrode of the second unidirectional conducting device is connected to the second terminal of the second capacitor. The first control circuit receives the switching signal (HI or LI) of the high-side switching transistor and/or the voltage (VSW) of the switching node to turn on/off the first switching transistor and the second switching transistor. The voltage stabilizing circuit is connected between the reference power voltage and the second terminal of the second capacitor. Herein, the voltage stabilizing circuit includes the third switching transistor Q3 and the second unidirectional conducting device D2. After passing through the voltage stabilizing circuit, the reference power voltage VDD provides a suitable stabilized voltage to charge the second capacitor C2.

Figure 3:
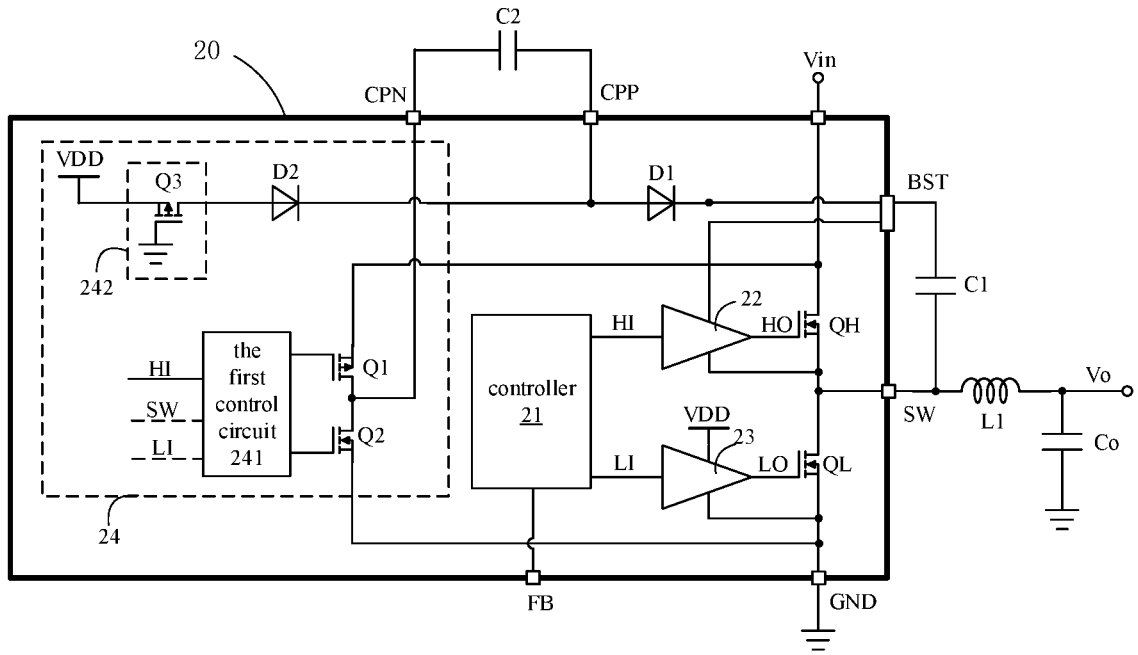
FIG. 3 is a block diagram of a supply circuit for an SMPS according to Embodiment 2 of the present disclosure.

FIG. 3 is a block diagram of a supply circuit for an SMPS according to Embodiment 2 of the present disclosure. The SMPS in the embodiment is the same as that in Embodiment 1. However, in the supply circuit, the second terminal of the second capacitor is connected to the second terminal of the first capacitor to charge the first capacitor. The second terminal of the first capacitor is connected to a supply terminal of the high-side driver to provide the first supply voltage for the high-side driver. In the embodiment, in the second time period, the second capacitor C2 is discharged to charge the first capacitor through the diode D1, thereby supplementing the charges of the first capacitor. Thereafter, the first capacitor provides a supply voltage for the supply terminal of the high-side driver. Therefore, the control is easier and more convenient. Likewise, when the high-side switching transistor QH is turned on for long time, and the first capacitor C1 has insufficient charging time and insufficient charges, the second capacitor C2 supplements the charges. This can make the SMPS work normally in any duty cycle.

Figure 5:
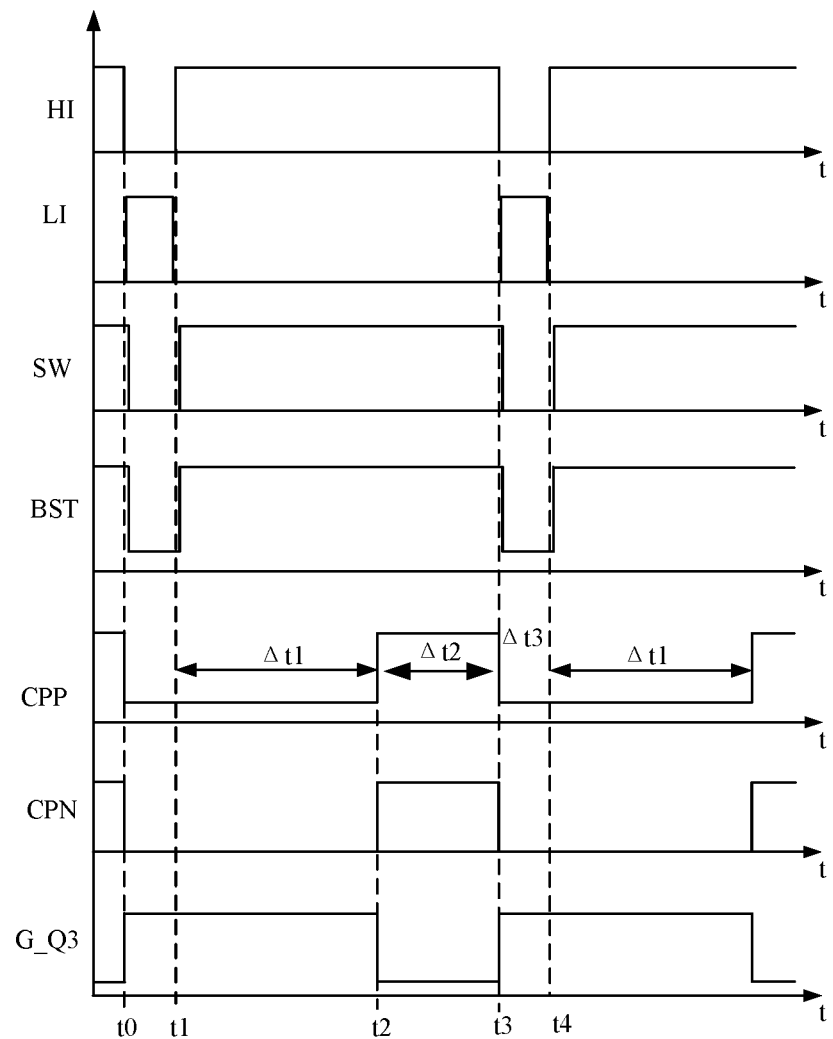
FIG. 5 illustrates a waveform chart of a first condition in FIG. 3.
Figure 6:
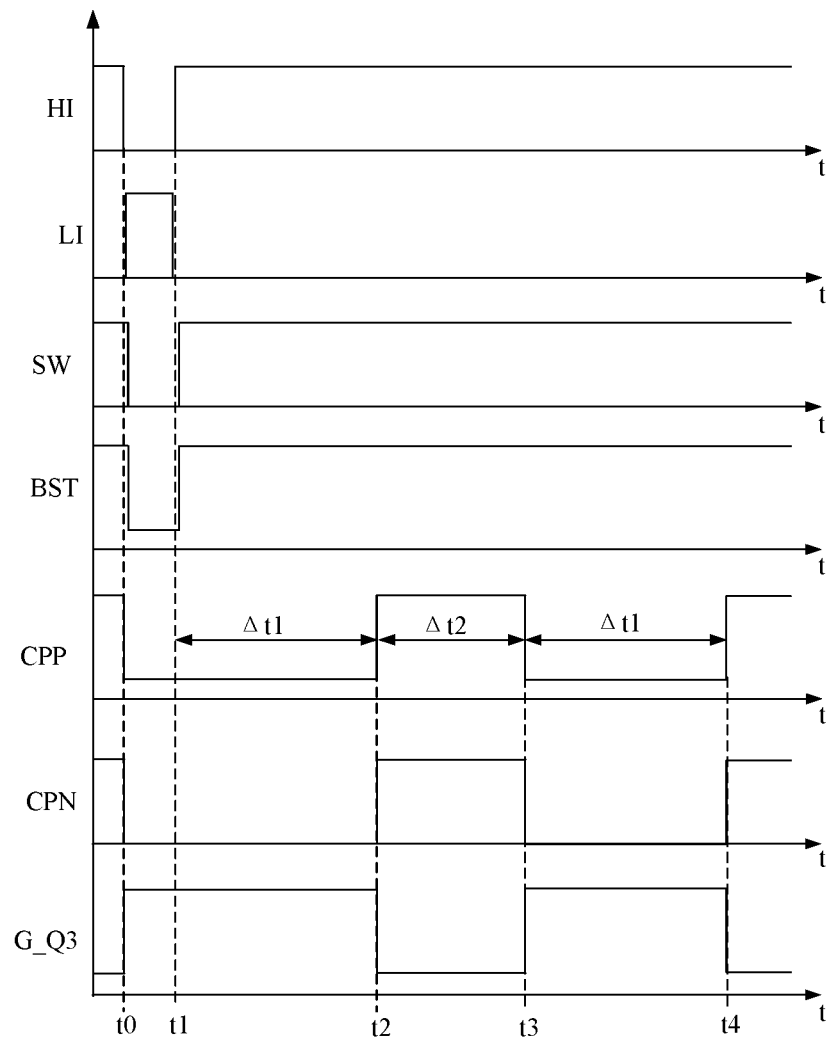
FIG. 6 illustrates a waveform chart of a second condition in FIG. 3.

FIG. 5 and FIG. 6 are two working waveform charts of FIG. 3. The working principle of the present disclosure is described below in conjunction with the working waveform charts. Referring to FIG. 5, at time t1 when the switching cycle is started, the switching signal of the high-side switching transistor changes from invalid to valid, and the voltage VSW of the switching node jumps to a high level. In this case, the charging-discharging control circuit generates a charging-discharging enable signal, thereby turning on the second switching transistor Q2, and turning off the first switching transistor Q1. The reference power voltage VDD charges the second capacitor through the voltage stabilizing circuit for first preset time. The first preset time can be timed by a timer, and is referred to as first charging time period $\Delta t1$. At time t2, the charging-discharging control circuit turns on the first switching transistor Q1, and turns off the second switching transistor Q2. The second capacitor is discharged through the diode D1. For example, the second capacitor is discharged through the diode to charge the first capacitor C1, so as to supplement charges of the first capacitor. When the switching signal of the high-side switching transistor changes from valid to invalid or before the voltage of the SW node jumps to a low level, namely at time t3, the charging-discharging control circuit stops discharging the second capacitor. The discharging time period is $\Delta t2$, which can be timed by the timer. The timer is then cleared to zero. For the example shown in FIG. 5, in the switching cycle, after the high-side switching transistor is turned on for some time, the switching signal changes to a low-level invalid state, the high-side switching transistor is turned off, the low-side switching transistor is turned on, the charging-discharging control circuit turns on the second switching transistor Q2 and turns off the first switching transistor Q1, and the reference power voltage VDD charges the second capacitor through the voltage stabilizing circuit. When the second capacitor is almost charged to the voltage VDD, the diode D1 is turned on, and the second capacitor C2 charges the first capacitor C1. The charging time period can be labeled as $\Delta t3$. At time t4 when the switching cycle is ended, the high-side switching transistor is turned on again, and the charging-discharging control circuit charges and discharges the second capacitor again according to a switching signal. The timer starts timing after reset and cleared to zero. Therefore, the first capacitor can be charged and supplemented with the charges. With control on the charging and discharging of the second capacitor, supply requirements of the SMPS in a large duty cycle are met.

Referring to FIG. 6, from time t1 to time t3, working state and principle are the same as those in FIG. 5. However, due to long turn-on time of the high-side switching transistor after time t3, the first capacitor C1 is not charged. In this case, if the voltage of the switching node does not jump from the low level to the high level or the switching signal of the high-side switching transistor does not change from invalid to valid, the charging-discharging control circuit charges the second capacitor for a second time. In other words, after time t3, the reference power voltage VDD recharges the second capacitor. After charging the second capacitor for the first time period, such as for the time period $\Delta t1$, the charging-discharging control circuit discharges the second capacitor for a second time, such as for the discharge time period $\Delta t2$, and so on. Therefore, the first capacitor can be charged and supplemented with the charges. With control on the charging and discharging of the second capacitor, supply requirements of the SMPS in a limiting condition, such as a state with very long turn-on time, are met.

Figure 4:
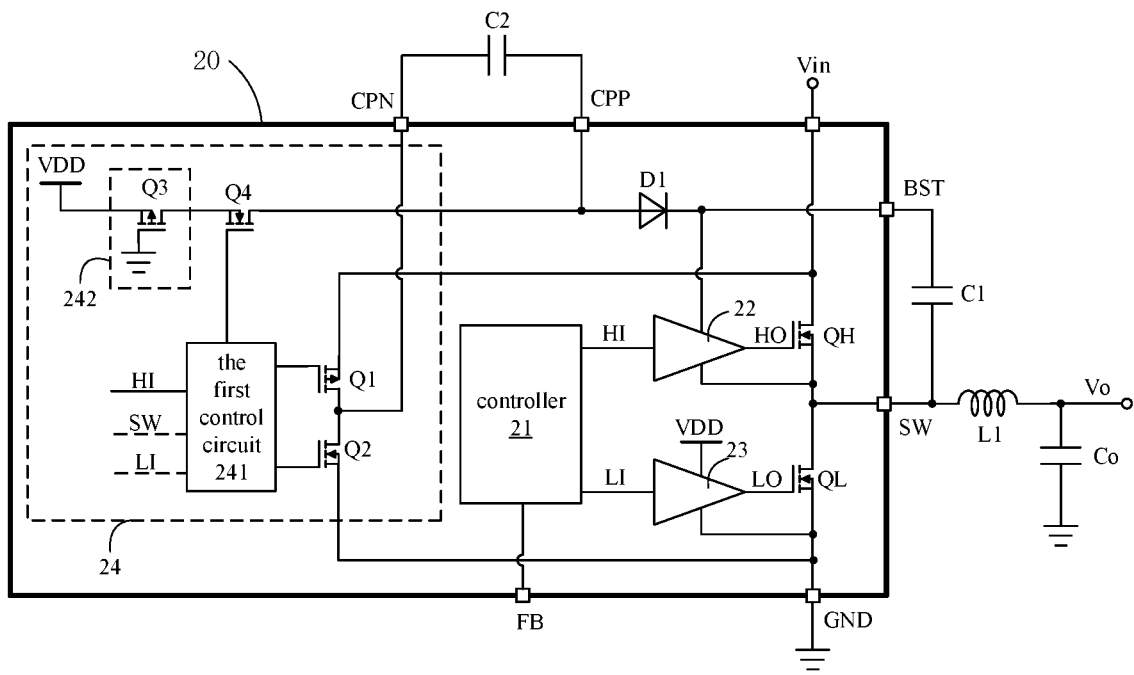
FIG. 4 is a block diagram of a supply circuit for an SMPS according to Embodiment 3 of the present disclosure.

FIG. 4 is a block diagram of a supply circuit for an SMPS according to Embodiment 3 of the present disclosure. The embodiment is basically the same as Embodiment 2. However, the voltage stabilizing circuit includes third switching transistor Q3 and fourth switching transistor Q4. The third switching transistor includes a control terminal connected to the reference ground, a first power terminal connected to the reference power voltage VDD, and a second power terminal connected to a first power terminal of the fourth switching transistor. A second power terminal of the fourth switching transistor is connected to the second terminal of the second capacitor. The first control circuit turns on or off the fourth switching transistor according to the switching signal of the high-side switching transistor and/or the voltage of the switching node. Herein, the fourth switching transistor Q4 is turned on or off like the second switching transistor Q2. When the second switching transistor Q2 is turned on, the fourth switching transistor Q4 is turned on, and the reference power voltage charges the second capacitor C2 through the voltage stabilizing circuit. With control on the fourth switching transistor Q4, the circuit cost can be saved, and the control can be convenient.

FIG. 7 is a block diagram of a supply circuit for an SMPS according to Embodiment 4 of the present disclosure. The SMPS in the embodiment is the same as that in the embodiment shown by FIG. 2. With the step-down SMPS as an example, same descriptions are not repeated. The supply circuit in the embodiment includes first capacitor C1, second capacitor C2, and charging-discharging control circuit 24. The first capacitor C1 includes a first terminal connected to the switching node SW, and a second terminal for providing a first supply voltage. The second capacitor includes first terminal CPN connected to reference ground GND or the switching node SW under control of the charging-discharging control circuit, and second terminal CPP for providing a second supply voltage. In a switching cycle, when the high-side switching transistor is turned on, the charging-discharging control circuit discharges the second capacitor in a second time period and charges the second capacitor in a first time period, thereby maintaining stable supply for the high-side driver. Herein, a duration of the first time period and a duration of the second time period are timed by a timer circuit of the charging-discharging control circuit. For example, after discharged for the second time period, the second capacitor is charged for the first time period.

Specifically, in the second time period, the second terminal of the second capacitor is discharged through a first unidirectional conducting device to provide supply charges, and the first terminal of the second capacitor C2 is connected to the switching node. Herein, the first unidirectional conducting device is diode D1. In the first time period, under the control of the charging-discharging control circuit, the second terminal of the second capacitor C2 receives reference power voltage VDD to charge the second capacitor, and the first terminal of the second capacitor is connected to the reference ground.

Referring also to FIG. 7, the second capacitor is charged and discharged under the control of the charging-discharging control circuit 24. The charging-discharging control circuit receives a switching signal of the high-side switching transistor (which may also be a switching signal of the low-side switching transistor), and obtains a charging-discharging enable signal according to the switching signal. The charging-discharging enable signal may be a pulse signal obtained according to a rising edge of the switching signal. Specifically, the charging-discharging control circuit includes first switching transistor Q1 and second switching transistor Q2 connected between the input voltage and the reference ground, a voltage stabilizing circuit, and first control circuit 241. Third switching transistor Q3 includes a control terminal connected to the reference ground, a first power terminal connected to the reference power voltage VDD, and a second power terminal connected to a positive electrode of a second unidirectional conducting device. A negative electrode of the second unidirectional conducting device is connected to the second terminal of the second capacitor. The first control circuit receives the switching signal (HI or LI) of the high-side switching transistor or the low-side switching transistor to obtain a charging-discharging enable signal, thereby turning on/off the first switching transistor and the second switching transistor. The voltage stabilizing circuit is connected between the reference power voltage and the second terminal of the second capacitor. Herein, the voltage stabilizing circuit includes the third switching transistor Q3 and fourth switching transistor Q4 (the fourth switching transistor may also be the diode). After passing through the voltage stabilizing circuit, the reference power voltage VDD provides a suitable stabilized voltage to charge the second capacitor C2.

FIG. 8 illustrates a waveform chart of a first condition in FIG. 7. At time t0, when the switching signal of the high-side switching transistor indicates that the high-side switching transistor is to be turned on, the charging-discharging control circuit generates a charging-discharging enable signal, thereby turning on the first switching transistor Q1, and turning off the second switching transistor Q2 and the third switching transistor Q3. The first terminal of the second capacitor has a same voltage as the switching node SW. The second capacitor is discharged. The first capacitor C1 is charged with charges of the second capacitor C2. The discharging time period is Δt2, which can be timed by a timer. At time t1 upon completion of discharging, the charging-discharging control circuit turns off the first switching transistor Q1, and turns on the second switching transistor Q2 and the third switching transistor Q3. The second capacitor is charged. The charging time period may be labeled as Δt1. At time t2, the charging is completed, and the second capacitor enters a next discharging stage. For the example shown in FIG. 8, in the switching cycle, after the high-side switching transistor is turned on for some time, the switching signal of the high-side switching transistor changes to a low-level invalid state, the high-side switching transistor is turned off, and the low-side switching transistor is turned on. At time t4, the switching cycle is ended. The high-side switching transistor is turned on again. The charging-discharging control circuit charges and discharges the second capacitor again according to a switching signal of the high-side switching transistor. For example, the charging-discharging control circuit discharges the second capacitor for the second time period, and then charges the second capacitor, and so on. The timer starts timing after reset and cleared to zero. Therefore, the first capacitor can be charged and supplemented with the charges. With control on the charging and discharging of the second capacitor, supply requirements of the SMPS in any duty cycle are met.

FIG. 9 illustrates a waveform chart of a second condition in FIG. 7. Likewise, at time t0, when the switching signal of the high-side switching transistor indicates that the high-side switching transistor is to be turned on, the charging-discharging control circuit turns on the first switching transistor Q1, and turns off the second switching transistor Q2 and the third switching transistor Q3. The first terminal of the second capacitor has a same voltage as the switching node SW. The second capacitor is discharged. The second capacitor C2 charges the first capacitor C1. The discharging time period is Δt2, which can be timed by a timer. At time t2 upon completion of discharging, the charging-discharging control circuit turns off the first switching transistor Q1, and turns on the second switching transistor Q2 and the third switching transistor Q3. The second capacitor is charged. The charging time period may be labeled as Δt1. At time t4, the charging is completed, and the second capacitor enters a next charging and discharging stage. At time t6, the switching cycle is ended. The high-side switching transistor is turned on again. The charging-discharging control circuit charges and discharges the second capacitor again according to a switching signal. For example, the charging-discharging control circuit discharges the second capacitor for the second time period, and then charges the second capacitor, and so on. The timer starts timing after reset and cleared to zero. However, for the switching cycle in the embodiment, the high-side switching transistor has less turn-on time than the second time period, and the low-side switching transistor also has very short turn-on time. For example, in the time period t2-t3 and the time period when the low-side switching transistor is turned off till the high-side switching transistor is turned on again, the high-side switching transistor and the low-side switching transistor are turned off, and the second capacitor is still charged and discharged according to the first time period and the second time period. In this way, when the high-side switching transistor and the low-side switching transistor are turned off, the high-side driver still has enough supply charges. When the high-side switching transistor is to be turned on, the high-side driver can work normally at once to drive the high-side switching transistor.

In the embodiment, when the switching signal of the high-side switching transistor or the switching signal of the low-side switching transistor indicates that the high-side switching transistor is turned on, the charging-discharging control circuit clears a present working state of the second capacitor, and discharges the second capacitor with the duration of the second time period as a timing start point. In other words, no matter whether the second capacitor is charged or discharged at present, the timer circuit is cleared to zero. The charging-discharging control circuit discharges the second capacitor and starts timing with the second time period as a new start. This can ensure that the second capacitor can be charged well to provide the charges in any condition.

In conclusion, the present disclosure realizes dual supply through the first capacitor and the second capacitor. In case of the insufficient supply charges of the first capacitor, the second capacitor can supplement the charges timely. This ensures that the driver of the high-side switching transistor can be supplied with enough charges, and the high-side switching transistor can work normally.

It is to be noted that the first time period and the second time period in the embodiments of the present disclosure are not limited in chronological order, and can be selected according to an actual condition.

Although the embodiments are separately illustrated and described above, the embodiments contain some common technologies. Those skilled in the art can replace and integrate the embodiments. Any content not clearly recorded in one of the embodiments may be determined based on another embodiment where the content is recorded.

The implementations described above do not constitute a limitation on the scope of protection of the technical solution of the present disclosure. Any modification, equivalent replacement, and improvement made in the spirit and principle of the above implementations should fall in the scope of protection of the technical solution of the present disclosure.

What is claimed is:

1. A supply circuit for a switched mode power supply (SMPS), wherein the SMPS comprises a high-side switching transistor and a low-side switching transistor, wherein the high-side switching transistor and the low-side switching transistor are connected through a switching node; the high-side switching transistor is driven by a high-side driver; the high-side switching transistor and the low-side switching transistor are switched to convert an input voltage into an output voltage; and the supply circuit comprises:
   a first capacitor, a second capacitor, and a charging-discharging control circuit, wherein the first capacitor comprises a first terminal connected to the switching node, and a second terminal for providing a first supply voltage; the second capacitor comprises a first terminal connected to a reference ground or a first potential terminal under control of the charging-discharging control circuit, and a second terminal for providing a second supply voltage; and the first supply voltage and the second supply voltage are configured as supply sources for the high-side driver; and
   the charging-discharging control circuit charges and discharges the second capacitor according to a charging-discharging enable signal, and specifically charges the second capacitor in a first time period, and discharges the second capacitor in a second time period, wherein a stable supply for the high-side driver is maintained.

2. The supply circuit according to claim 1, wherein the second terminal of the first capacitor is connected to a supply terminal of the high-side driver to provide the first supply voltage for the high-side driver; and
   the second terminal of the second capacitor is connected to the supply terminal of the high-side driver to provide a supply voltage for the high-side driver; and the second terminal of the second capacitor is connected to the second terminal of the first capacitor to provide a supply voltage for the first capacitor.

3. The supply circuit according to claim 1, wherein the second terminal of the second capacitor is connected to the second terminal of the first capacitor to provide a supply voltage for the first capacitor; and
   the second terminal of the first capacitor is connected to a supply terminal of the high-side driver to provide the first supply voltage for the high-side driver.

4. The supply circuit according to claim 1, wherein the first potential terminal serves as an input voltage connecting terminal.

5. The supply circuit according to claim 4, wherein the charging-discharging control circuit receives a switching signal of the high-side switching transistor and/or a voltage of the switching node, and obtains the charging-discharging enable signal to charge and discharge the second capacitor.

6. The supply circuit according to claim 4, wherein when a voltage of the switching node jumps from a low level to a high level or a switching signal of the high-side switching transistor changes from invalid to valid, the charging-discharging control circuit charges the second capacitor.

7. The supply circuit according to claim 6, wherein the charging-discharging control circuit discharges the second capacitor after charging the second capacitor for the first time period; and
   before the voltage of the switching node jumps from the high level to the low level or when the switching signal of the high-side switching transistor changes from valid to invalid, the charging-discharging control circuit stops discharging the second capacitor, a discharging time of the second capacitor being labeled as the second time period.

8. The supply circuit according to claim 5, wherein when the voltage of the switching node jumps from a low level to a high level or the switching signal of the high-side switching transistor changes from invalid to valid, the charging-discharging control circuit charges the second capacitor for a first time, and
   the charging-discharging control circuit discharges the second capacitor for a first time after charging the second capacitor for the first time period; and
   after the charging-discharging control circuit discharges the second capacitor for the second time period, if the voltage of the switching node does not jump from the low level to the high level or the switching signal of the high-side switching transistor does not change from invalid to valid, the charging-discharging control circuit charges the second capacitor for a second time, and
   the charging-discharging control circuit discharges the second capacitor for a second time after charging the second capacitor for the first time period, and so on.

9. The supply circuit according to claim 4, wherein in the first time period, under the control of the charging-discharging control circuit, the second terminal of the second capacitor receives a reference power voltage to charge the second capacitor, and the first terminal of the second capacitor is connected to the reference ground; and
   in the second time period, the second terminal of the second capacitor outputs supply charges through a first unidirectional conducting device, and the first terminal of the second capacitor is connected to the input voltage connecting terminal.

10. The supply circuit according to claim 4, wherein in the first time period, the charging-discharging control circuit charges the second capacitor with a reference power voltage; and
    when the high-side switching transistor is turned off, the charging-discharging control circuit recharges the second capacitor with the reference power voltage; and the second supply voltage is configured to charge the first capacitor.

11. The supply circuit according to claim 1, wherein the first potential terminal serves as a common node for the high-side switching transistor and the low-side switching transistor.

12. The supply circuit according to claim 11, wherein the charging-discharging control circuit receives a switching signal of the high-side switching transistor or a switching signal of the low-side switching transistor, and obtains the charging-discharging enable signal to charge and discharge the second capacitor.

13. The supply circuit according to claim 11, wherein when the switching signal of the high-side switching transistor or the switching signal of the low-side switching transistor indicates that the high-side switching transistor is turned on, the charging-discharging control circuit discharges the second capacitor.

14. The supply circuit according to claim 13, wherein the charging-discharging control circuit charges the second capacitor after discharging the second capacitor for the second time period;
    after the second capacitor is charged for the first time period, the charging-discharging control circuit stops charging the second capacitor; and
    the charging-discharging control circuit times a duration of the first time period and a duration of the second time period through a timer circuit.

15. The supply circuit according to claim 14, wherein the charging-discharging control circuit discharges the second capacitor for a first time; and the charging-discharging control circuit charges the second capacitor for a first time after discharging the second capacitor for the second time period; and
    after the charging-discharging control circuit discharges the second capacitor for the second time period, if the switching signal of the high-side switching transistor or the switching signal of the low-side switching transistor does not indicate that the high-side switching transistor is turned on, the charging-discharging control circuit discharges the second capacitor for a second time, and the charging-discharging control circuit charges the second capacitor for a second time after discharging the second capacitor for the second time period, and so on;
    wherein when the switching signal of the high-side switching transistor or the switching signal of the low-side switching transistor indicates that the high-side switching transistor is turned on, the charging-discharging control circuit clears a present working state of the second capacitor, and discharges the second capacitor with the duration of the second time period as a timing start point.

16. The supply circuit according to claim 11, wherein in the second time period, under the control of the charging-discharging control circuit, the second terminal of the second capacitor receives a reference power voltage to charge the second capacitor, and the first terminal of the second capacitor is connected to the reference ground; and
    in the first time period, the second terminal of the second capacitor outputs supply charges through a first unidirectional conducting device, and the first terminal of the second capacitor is connected to the common node.

17. The supply circuit according to claim 4, wherein the charging-discharging control circuit comprises a first switching transistor and a second switching transistor, a voltage stabilizing circuit, and a first control circuit, wherein the first switching transistor and the second switching transistor are connected between the first potential terminal and the reference ground;
    the first control circuit receives the charging-discharging enable signal to turn on/off the first switching transistor and the second switching transistor; and
    the voltage stabilizing circuit is connected between a reference power voltage and the second terminal of the second capacitor.

18. The supply circuit according to claim 17, wherein the voltage stabilizing circuit comprises a third switching transistor and a second unidirectional conducting device; and
    the third switching transistor comprises a control terminal connected to the reference ground, a first power terminal connected to the reference power voltage, and a second power terminal connected to a positive electrode of the second unidirectional conducting device; and a negative electrode of the second unidirectional conducting device is connected to the second terminal of the second capacitor.

19. The supply circuit according to claim 17, wherein the voltage stabilizing circuit comprises a third switching transistor and a fourth switching transistor;
    the third switching transistor comprises a control terminal connected to the reference ground, a first power terminal connected to the reference power voltage, and a second power terminal connected to a first power terminal of the fourth switching transistor; and
    a second power terminal of the fourth switching transistor is connected to the second terminal of the second capacitor; and the first control circuit turns on or off the fourth switching transistor according to the charging-discharging enable signal.

20. A switched mode power supply (SMPS), comprising a controller, a high-side switching transistor and a low-side switching transistor connected through a switching node, a high-side driver for driving the high-side switching transistor, and a low-side driver for driving the low-side switching transistor, and further comprising the supply circuit according to claim 1, wherein
    the high-side driver and the low-side driver receive a switching signal from the controller to turn on or off the high-side switching transistor and the low-side switching transistor; and
    the supply circuit supplies power to the high-side driver.

* * * * *